Feb. 22, 1966   MASHIO YAMAHA   3,236,744
YEAST FERMENTATION APPARATUS
Filed Oct. 23, 1963   2 Sheets-Sheet 1

Feb. 22, 1966     MASHIO YAMAHA     3,236,744
YEAST FERMENTATION APPARATUS
Filed Oct. 23, 1963     2 Sheets-Sheet 2

United States Patent Office 3,236,744
Patented Feb. 22, 1966

3,236,744
YEAST FERMENTATION APPARATUS
Mashio Yamaha, Tokyo, Japan, assignor to Ebara-Infilco Kabushiki Kaisha, Tokyo, Japan, a corporation of Japan
Filed Oct. 23, 1963, Ser. No. 318,274
Claims priority, application Japan, Dec. 26, 1962, 37/78,926
7 Claims. (Cl. 195—143)

The present invention relates to yeast fermentation apparatus.

In the past, apparatus for making yeast products from a liquid including a sugar component, such as sulfite pulp waste or drainage molasses liquid (in this specification the term "liquid" means such liquid comprising the sugar component), a fermentation tank of the "Waldhof" type comprising an impeller and a draft tube for the agitation and the circulation has been used. In the fermentation tank of this type, it is necessary that the agitation and the circulation of the liquid be sufficient in order to effectively perform the fermentation.

In the fermentation tank provided with an impeller for the agitation and the circulation beneath and close to a draft tube disposed in the center of the tank, part of the liquid between the lower end of the draft tube and the impeller is ejected outwardly by the rotation thereof, and then the ejected part of the liquid reaches the level of the liquid, and therefrom flows into the draft tube and flows down therethrough. The part of the liquid at the lower end of said draft tube is ejected by the operation of the impeller, whereby circulation and the agitation are performed. In another type of fermentation apparatus, openings or windows are provided on the upper portion of the cylindrical wall of the draft tube, through which the liquid flows into the draft tube. In such apparatus, a volume of the liquid to be circulated is proportional to the distance between a plane including the upper end surfaces of the blades of the impeller and a plane including the lower end surface of the lower opening portion of the draft tube, or stated otherwise the size of the gap between the lower end of the draft tube and the impeller. If the volume of the liquid to be circulated is not adjusted in accordance with the physical and the chemical character of the liquid to be treated, an effective fermentation will not be performed at high efficiency. However, in the known fermentation tank, there has not been known any means for adjusting the volume of the liquid which should be circulated.

An object of the present invention is to provide a fermentation tank comprising a tubular member or an attachment mounted detachably on the lower end portion of the draft tube to adjust the height of the gap between the lower end of the draft tube and the impeller, in which the tubular member is secured to the draft tube to keep the gap predetermined in accordance with the properties of the liquid to be treated. It is one of the important features of the present invention that the tubular member is so disposed that the size of the gap between the lower end of the draft tube and the impeller may be predetermined according to the properties of the liquid to be treated. However, in spite of the above improvement in the fermentation tank, the desired efficiency is not obtained in a particular case. This is the case in which the volume of the liquid supplied into the tank varies in relation to time.

In a plant comprising a fermentation tank directly connected with a supply source of waste liquid wherein the waste liquid is supplied continuously to the tank, said waste liquid increases or decreases in relation to time. In case the quantity (or volume) of the liquid to be treated varies, the quantity of the part of liquid flowing into the draft tube varies. The quantity of the liquid flowing into the draft tube must be kept constant in order to obtain high efficiency.

On the other hand, there is a case in which the character of air-liquid emulsion to be treated varies in relation to time. In such a case, the quantity of the liquid flowing into the draft tube must be controlled.

If the quantity of the liquid supplied into the tank or the air in the tank increases, also the quantity flowing into the draft tube will increase, so that a circulating amount of the liquid may increase in comparison with the optimum quantity. Contrary to this, if the quantity of the liquid flowing into the draft tube in comparison with the optimum quantity decreases, the quantity of the circulating liquid will decrease, and it results that the efficiencies of the absorption of oxygen and the agitation of the liquid in the tank will decrease. In the present invention, the fermentation tank is provided with adjusting means to keep optimum the quantity of the liquid which flows into the draft tube.

Another object of the present invention is to provide an apparatus comprising means for adjusting the rate of opening of the openings formed on the peripheral wall of the draft tube.

In the fermentation tank according to the present invention, the circulating volume of emulsion is so maintained that it is most adequate for the treatment by adjusting the opening ratio of the windows formed on the draft tube. This adjusting means is constituted of shutter means which is able to move along the inner peripheral surface of the draft tube and is operative for each window or opening. In one embodiment, the means is able to be operated by a driving rod from the outside of the draft tube. Each of the plates of the shutter means are simultaneously operated by a single rod such as the driving rod.

Other objects and advantages of the present invention will be apparent from the following description taken with reference to the accompanying drawings, in which.

Figure 1:
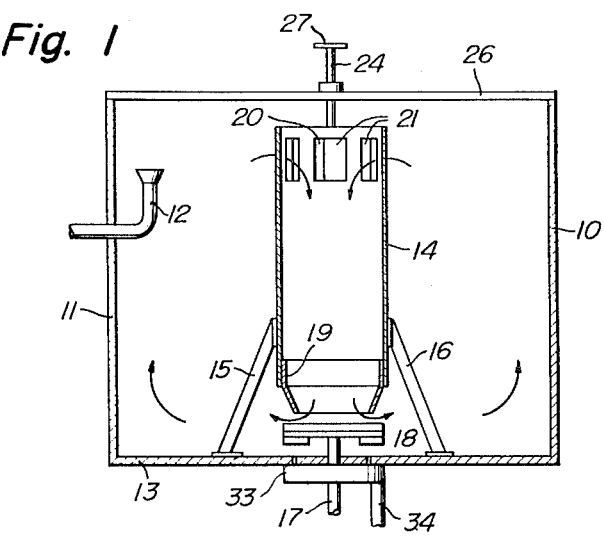
FIGURE 1 is a vertical sectional view showing fermentation apparatus according to the present invention.
Figure 2:
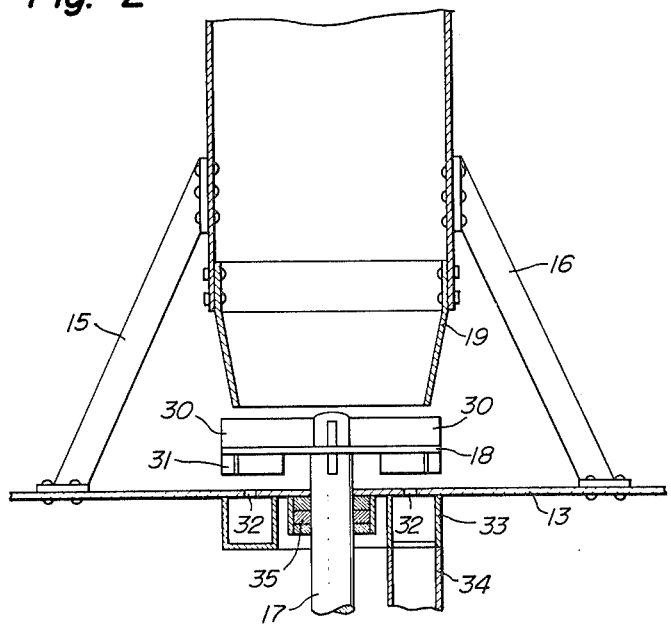
FIGURE 2 is an enlarged partial view of the apparatus shown in the FIGURE 1, showing the lower end of the draft tube and the impeller.
Figure 3:
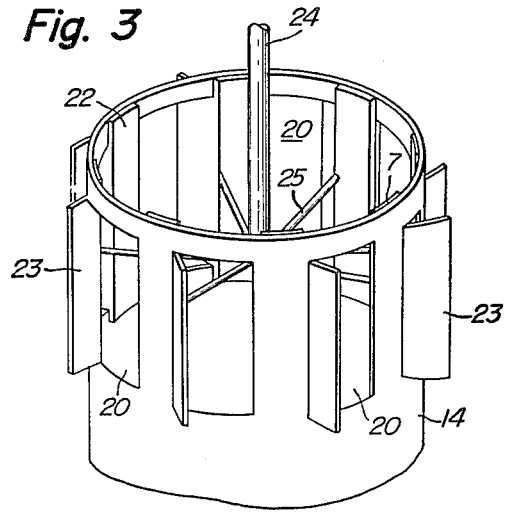
FIGURE 3 is an enlarged perspective view showing the upper portion of the draft tube shown in FIGURE 1 and the adjusting means for the gates.

In FIGURE 1, there is shown a fermentation tank body 10 open at the upper end and provided with an intake means 12 such as a pipe on the side wall 11 adjacent the upper end thereof. A draft tube 14 is mounted vertically on the bottom wall 13 of the tank body 10 by supporting members 15 and 16 with the lower end of the draft tube 14 spaced from said bottom wall 13. A rotary shaft 17 carries an impeller 18 at the upper end thereof and extends through the bottom wall 13 to the inside of the tank body 10, so that said impeller 18 is positioned in the space or gap between the lower end of the draft tube 14 and the bottom wall 13.

The draft tube 14 is detachably provided with an attachment ring 19 constituting a lower tube portion for adjusting the size of said gap. Said attachement ring 19 has a reversed conical shaped portion in the lower portion thereof. This attachment 19 is secured in place to the draft tube 14 after the size of the gap between the lower end thereof and the impeller 18 is established in accordance with the character and the quantity of the liquid to be treated in the tank body 10.

Said draft tube 14 is provided with openings 20 or windows on the peripheral wall portion adjacent the upper end thereof. These openings 20 are arranged on the same level at regular intervals, and are formed in a rectangular shape having the same height and the same width in relation to each other. Opening ratio adjusting plates 21 are disposed for the openings 20. Each of the adjusting plates 21 is composed of a base portion 22 which is able to move in contact with the inner peripheral surface of the draft tube 14 and a projecting portion 23 formed integrally with said base portion 22. The height of the projecting portion 23 is the same as that of the openings 20 and the height of the base portion 22 is larger than that of the openings 20. The outer surface of the base portion 22 has the same curvature as that of the inner peripheral surface of the draft tube 14. The adjusting plate is so disposed that the projecting portion 23 is projected outwardly through the opening 20 and the base portion 22 contacts the inner peripheral surface of the draft tube and is driven by a suitable driving means. Such driving means comprises a central operating rod 24, radial spokes 25 of the same number as that of said adjusting plate and a handle 27 mounted on the upper end of the rod 24. The plates 21 are secured to the outer ends of the spokes 25. The inner ends of said spokes 25 are fixed to said central rod 24. The central rod 24 is supported rotatably on a beam member 26 bridged diametrically at the opening of the tank body 10. Thus, the central rod 24 may be rotated by the handle 27, whereby each plate 21 may be moved to vary the opening ratio of the window 20 of the draft tube 14.

Figure 4:
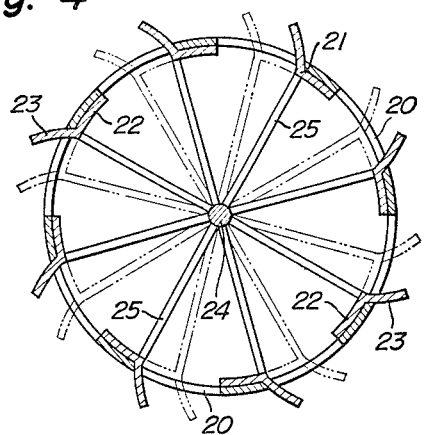
FIGURE 4 is a horizontal sectional view of the portion shown in FIGURE 3.

In FIGURE 4 one of the operating conditions of the plate 22 is illustrated in chain lines. In the position shown by the chain lines, each plate 21 closes one half of each gate and opens the remaining one half to cause the liquid to flow in accordance with the opening ratio of the window. This adjustment is effected, as aforesaid, in response to the variation of the liquid quantity to be supplied.

The impeller comprises circulating blades 30, preferably six or seven blades, disposed radially on a disc of the impeller and mixing blades 31, preferably six or seven blades, radially disposed on the under surface of said disc, each blade 31 extending radially from the peripheral edge of said disc to an intermediate location on the radius.

A plurality of small holes 32 are formed in the bottom wall 13 of the tank body 10, and said small holes 32 are arranged on the same circle and beneath the impeller 18. The diameter of said circle is approximately the same as the diameter of a circle passing through each intermediate point of said blades 31. On the under surface of the bottom wall 13, there is an annular air duct 33 connected directly with said plurality of small holes 32. An air supplying pipe 34 is connected to said air duct 33, which pipe 34 is connected with a suitable compressed air or oxygen enriched air source.

In order to keep a liquid tight between the rotary shaft 17 and the bottom wall 13, sealing means 35 is provided around the shaft 17 on the under surface of said bottom wall 13.

In the tank body 10, a circulation shown in the direction of arrows is produced. The opening ratio of the gates 20 should be selected to establish optimum circulation and should be adjusted in accordance with the variation in the quantity of the supplied liquid into the tank body 10, e.g. should be adjusted in accordance with the rise or lowering of the level of the liquid in the tank, as aforementioned. Air or oxygen enriched air is supplied through the pipe 34 and the duct 33 to the small holes 32, and is thence blown into the liquid as bubbles. There may relatively large bubbles among the group of bubbles. In order to obtain high efficiency of fermentation, the relatively large bubbles should be divided so as to be as small as possible. In the present invention, in order to perform this object the blades for mixing air with the liquid are provided in the impeller at the position directly above the small holes for the aeration. Air blown into the liquid through the small holes 32 on the bottom wall 13 of the tank is formed as finely divided bubbles so as to be mixed with the liquid sufficiently.

In one embodiment according to the present invention, the diameter of the tank is 7.5 m., the tank height thereof is 4 m. and the diameter of the impeller is 1.4 m.

A liquid including a raw waste (sulfite liquor) and air in the ratio of 40% to 60% by volume was treated in the tank as illustrated by FIGURE 1. The fermentation was continuously performed by use of Torula-yeast with the aeration. This raw waste has a sugar content of 3-4%, of which the specific gravity is about 10.5. The specific gravity of the air-liquid emulsion in the fermentation is 0.35 to 0.4. The total amount of solids dissolved in the liquid is about 10 to 15%. In the fermentation in the tank having a capacity of about 200 m.$^3$, the continuous fermentation was performed for several months without additional supply of the seed of the yeast. A dry yeast of 50 to 60% per quantity of consumed sugar was obtained from the above treatment.

What is claimed is:

1. Yeast fermentation apparatus comprising a tank body adapted for containing a fermentable substance, a draft tube mounted centrally in said body for the circulation of said substance therethrough, said draft tube including an adjustably secured lower tube portion which is spaced from the tank body and which is extensible and retractable in varying magnitude with respect to said draft tube, a rotatable circulating impeller in said tank body positioned beneath the lower tube portion in spaced relation therewith to define a gap therebetween, and aeration means for supplying oxygen-containing gas into the tank body beneath said impeller, the said lower tube portion being adjustable in position to vary the size of the gap between the impeller and the lower tube portion.

2. Yeast fermentation apparatus as claimed in claim 1 wherein said draft tube has an upper portion provided with regularly arranged openings therein, the apparatus further comprising means supported by said tank body and extending within the draft tube for blocking the openings in said tubes in adjustable manner.

3. Yeast fermentation apparatus as claimed in claim 2 wherein said means for blocking the openings comprises a central rod, a plurality of radial spokes on said rod one for each opening, an adjusting plate on each spoke including a base portion in peripheral contact with the draft tube at a respective opening and a projecting portion on said base portion extending through said respective opening and means rotatably securing the rod from the tank body to permit rotation of the rod and adjustable blocking of the openings by the adjusting plates.

4. Yeast fermentation apparatus as claimed in claim 2 wherein said impeller includes a circular disc having an upper surface facing the lower tube portion and a lower surface facing the tank body, a plurality of circulating blades on the upper surface of the disc and a plurality of mixing blades on the lower surface of the disc, the mixing blades extending radially from the outer periphery of the disc to an intermediate location on the radius of the disc.

5. Yeast fermentation apparatus as claimed in claim 3 wherein said aeration means comprises an annular duct externally on said tank body at a location beneath the disc of the impeller and adapted for being supplied with oxygen-containing gas, said tank body being provided with a plurality of holes in communication with said duct for the supply of the gas into the tank body, said holes, being positioned in said tank body along a circle in which the holes are located beneath the mixing blades at a point intermediate the ends of the mixing blades.

6. Fermentation apparatus comprising a tank body adapted for containing a fermentable substance, a draft tube mounted in said body for the circulation of said substance therethrough, said tube having a lower end spaced from the tank body, impeller means in the tank body at a spaced location beneath the lower end of the tube for the forceable circulation of the substance, aeration means for supplying oxygen-containing gas into the tank body and into the substance therein, and means connected to the lower end of the draft tube for adjustment towards and away from the impeller means to vary the spacing therebetween.

7. Fermentation apparatus comprising a tank body adapted for containing a fermentable substance, a draft tube mounted in said body for the circulation of said substance therethrough, said tube having a lower end spaced from the tank body, impeller means in the tank body at a spaced location beneath the lower end of the tube for the forceable circulation of the substance, aeration means for supplying oxygen-containing gas into the tank body and the substance therein, means connected to the lower end of the draft tube for adjustment towards and away from the impeller means to vary the spacing therebetween, said draft tube having an upper end with a plurality of openings therein, and means connected to said tank body and projecting into the draft tube for adjustably blocking the openings.

References Cited by the Examiner
UNITED STATES PATENTS

| | | | |
|---|---|---|---|
| 2,522,947 | 9/1950 | Hatch et al. | 195—143 |
| 2,750,328 | 6/1956 | Stimpson et al. | 195—142 |
| 2,840,355 | 6/1958 | Stratford | 259—95 |
| 2,983,652 | 5/1961 | Baerfuss | 195—143 |

A. LOUIS MONACELL, *Primary Examiner.*

A. E. TANENHOLTZ, *Assistant Examiner.*